United States Patent
Said et al.

(10) Patent No.: US 9,280,676 B2
(45) Date of Patent: Mar. 8, 2016

(54) DEVELOPMENT OF BUSINESS APPLICATIONS

(71) Applicants: Bare Said, Sankt Leon-ROT (DE); Frank Jentsch, Muehlhausen (DE); Frank Brunswig, Heidelberg (DE)

(72) Inventors: Bare Said, Sankt Leon-ROT (DE); Frank Jentsch, Muehlhausen (DE); Frank Brunswig, Heidelberg (DE)

(73) Assignee: SAP SE, Walldorf (DE)

( * ) Notice: Subject to any disclaimer, the term of this patent is extended or adjusted under 35 U.S.C. 154(b) by 404 days.

(21) Appl. No.: 13/675,854

(22) Filed: Nov. 13, 2012

(65) Prior Publication Data

US 2014/0137075 A1    May 15, 2014

(51) Int. Cl.
  *G06F 9/44*    (2006.01)
  *G06F 21/62*   (2013.01)

(52) U.S. Cl.
  CPC .............. *G06F 21/6218* (2013.01); *G06F 8/20* (2013.01)

(58) Field of Classification Search
  CPC .............................. G06F 8/20; G06F 21/6218
  See application file for complete search history.

(56) References Cited

U.S. PATENT DOCUMENTS

2004/0205355 A1*  10/2004  Boozer et al. ................. 713/200
2007/0239471 A1*  10/2007  Patton et al. ..................... 705/1

* cited by examiner

*Primary Examiner* — Li B Zhen
*Assistant Examiner* — Viva Miller
(74) *Attorney, Agent, or Firm* — Brake Hughes Bellermann LLP

(57) ABSTRACT

In accordance with aspects of the disclosure, a system and methods are provided for managing development of business applications. The system and methods may be provided for defining security relevance for data types associated with business objects, defining security rules for the data types associated with the business objects, and defining validation and test fulfillment of the security rules by providing one or more security runtime modules for each security rule defined by the security rules handler to ensure validation and test fulfillment of each security rule.

15 Claims, 4 Drawing Sheets

US 9,280,676 B2

DEVELOPMENT OF BUSINESS APPLICATIONS

TECHNICAL FIELD

The present description relates to computer-based techniques and methods for managing development of business applications.

BACKGROUND

Software application and development environments based on business objects provide for ease of development and use of related software applications. For instance, business objects may be used to encapsulate defined attributes, values, and associated data, as well as related logic and/or associated behaviors. Thus, a business object may correspond to, or represent, a specific technical, semantic, and/or tangible entity that is known to have certain properties and capabilities, and may interact with other business objects representing corresponding entities to thereby collectively provide a desired functionality. Due to their modular properties and other known aspects, business objects may enable fast, convenient development of highly customized software applications that are straightforward for a developer to implement, and likely to fulfill needs and requirements of consumers or other users thereof.

In conventional environments that utilize business objects for development of business applications, demand for secure software that fulfills various aspects of security requirements is increasing continuously. This demand is not only coming from a customer side but also from a software company side due to negative impacts that may be caused by late detection of security gaps in software. Therefore, security requirements and related aspects should be addressed and considered earlier in designing software and should be integrated with software architecture. As such, there currently exists a need to improve management of business applications where security requirements for software are thoroughly considered during development phases.

SUMMARY

In accordance with aspects of the disclosure, a computer system may be provided for managing development of business applications. The computer system may include instructions recorded on a non-transitory computer-readable medium and executable by at least one processor. The computer system may include a security compliant manager configured to cause the at least one processor to manage development of business applications based on security relevance and security rules for one or more entities used by a security enforcement framework for each business application. The security compliant manager may include a security relevance handler configured to define the security relevance for data types associated with business objects by ensuring that the one or more entities of each business application are classified in reference to the security relevance of the data types for the business objects. The security compliant manager may include a security rules handler configured to define the security rules for the data types associated with the business objects by assigning the security rules to each entity of each business application classified by the security relevance of the data types for the business objects. The security compliant manager may include a validation handler configured to define validation and test fulfillment of the security rules by providing one or more security runtime modules for each security rule defined by the security rules handler to ensure validation and test fulfillment of each security rule assigned to each entity of each business application classified by the security relevance of the data types for the business objects.

In accordance with aspects of the disclosure, a computer-implemented method may be provided for managing development of business applications based on security relevance and security rules for one or more entities used by a security enforcement framework for each business application. The computer-implemented method may include defining the security relevance for data types associated with business objects by ensuring that the one or more entities of each business application are classified in reference to the security relevance of the data types for the business objects. The computer-implemented method may include defining the security rules for the data types associated with the business objects by assigning the security rules to each entity of each business application classified by the security relevance of the data types for the business objects. The computer-implemented method may include defining validation and test fulfillment of the security rules by providing one or more security runtime modules for each security rule defined by the security rules handler to ensure validation and test fulfillment of each security rule assigned to each entity of each business application classified by the security relevance of the data types for the business objects.

In accordance with aspects of the disclosure, a computer program product may be provided that is tangibly embodied on a non-transitory computer-readable storage medium and includes instructions that, when executed by at least one processor, are configured to manage development of business applications based on security relevance and security rules for one or more entities used by a security enforcement framework for each business application. The instructions, when executed by the at least one processor, may be configured to define the security relevance for data types associated with business objects by ensuring that the one or more entities of each business application are classified in reference to the security relevance of the data types for the business objects. The instructions, when executed by the at least one processor, may be configured to define the security rules for the data types associated with the business objects by assigning the security rules to each entity of each business application classified by the security relevance of the data types for the business objects. The instructions, when executed by the at least one processor, may be configured to define validation and test fulfillment of the security rules by providing one or more security runtime modules for each security rule defined by the security rules handler to ensure validation and test fulfillment of each security rule assigned to each entity of each business application classified by the security relevance of the data types for the business objects.

As provided herein, details of one or more implementations are set forth in the accompanying drawings and the description below. Other features will be apparent from the description and drawings, and from the claims.

DETAILED DESCRIPTION

To overcome the deficiencies of conventional environments that utilize business objects (BO) for development of business applications, aspects of the disclosure address security requirements and provide for earlier development during software design phases for integration directly in software architecture. Therefore, implementation and verification of security relevant features may be achieved during software development phases. Further, development infrastructure may be extended to support and enforce in a built-in manner definition, implementation, and verification of security relevant features and functions during the development of business applications.

Accordingly, aspects of the disclosure provide for highly secure business applications. In various implementations, a built-in security enforcement framework may compel developers and security engineers to consider and handle security aspects of a business application during modeling, development, testing, and verification phases. The built-in security enforcement framework may be used to support and enable definition, implementation, and compliance fulfillment of security rules that may cover the various building blocks of business applications, in a manner as described herein.

Figure 1:
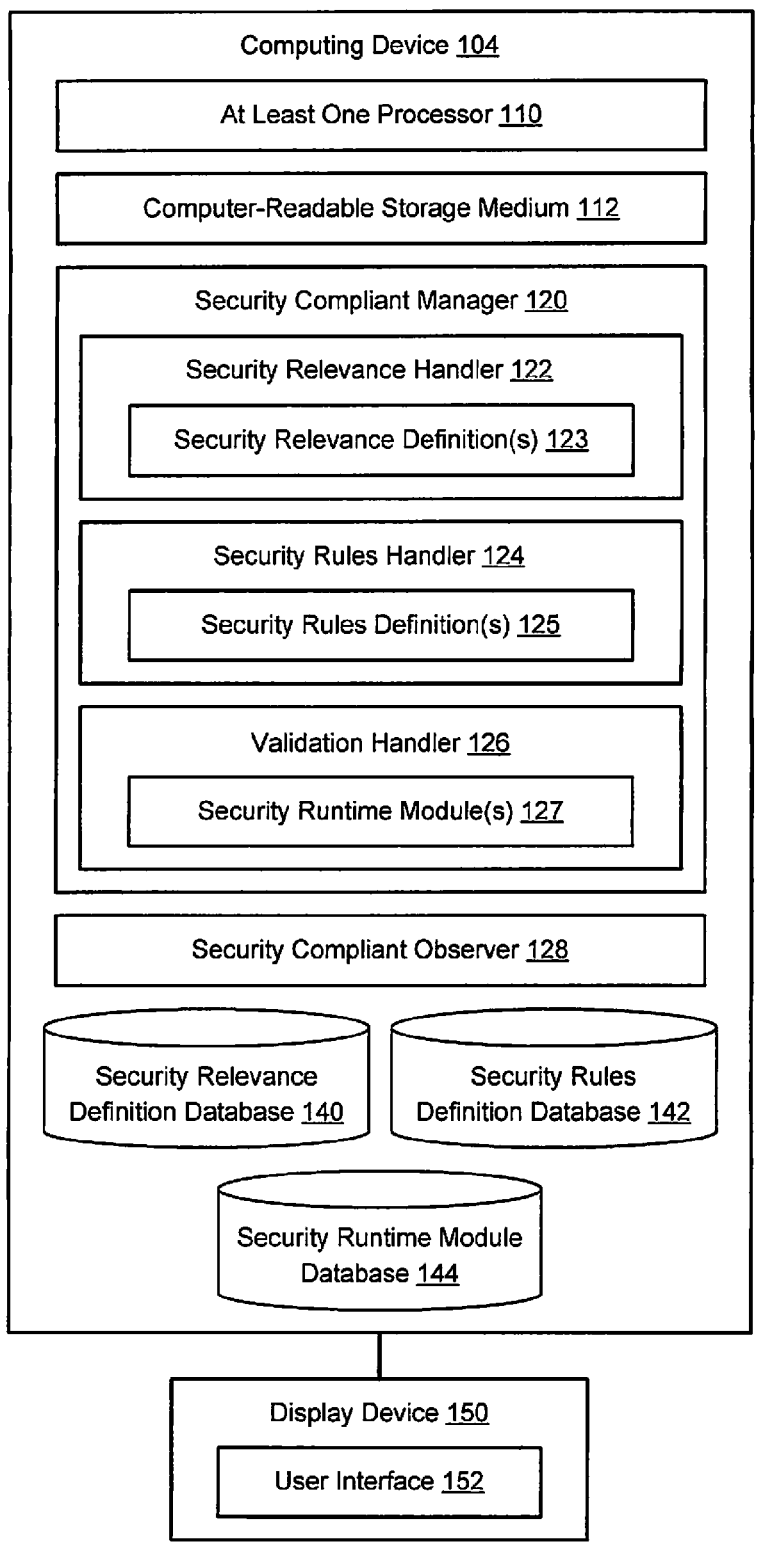
FIG. 1 is a block diagram illustrating an example system for managing development of business applications, in accordance with aspects of the disclosure.

FIG. 1 is a block diagram illustrating an example system 100 for managing development of business applications, in accordance with aspects of the disclosure.

In the example of FIG. 1, the system 100 comprises a computer system for implementing a security management system for managing development of business applications that may be associated with a computing device 104, thereby transforming the computing device 104 into a special purpose machine designed to determine and implement the technique(s), method(s), and process(es), as described herein. In this regard, it may be appreciated that the computing device 104 may include any standard element(s), including at least one processor(s) 110, memory 112 (e.g., a non-transitory computer-readable medium), power, peripherals, and various other computing elements not specifically shown in FIG. 1. The system 100 may be associated with a display device 150 (e.g., a monitor or other display) that may be used to provide a user interface (UI) 152, such as, for example, a graphical user interface (GUI). In an example, the UI 152 may be used to receive parameters, preferences, and instructions from a user for managing or utilizing the system 100. For instance, the UI 152 may be configured to receive user input for defining business objects (BO) and/or properties thereof. Further, it should be appreciated that various other elements of the system 100 that may be useful for implementing the system 100 may be added or included, as would be apparent to one of ordinary skill in the art, without departing from the scope of the disclosure.

In accordance with aspects of the disclosure, the term 'business object' may be understood to represent, virtually any software object that seeks to encapsulate data and associated methods, and which represent an entity within a modular software development environment. Generally, such software objects may be known by many different nomenclatures and terminologies, and may include, for example, enterprise java beans (EJBs), advanced business application programming (ABAP) objects, business objects, and/or variations thereof.

In some examples, references are made primarily to business objects in corporate or enterprise settings. However, it should be appreciated that the term business should be understood to represent virtually any profit related activities associated with a legal entity, as well as various not-for-profit entities, such as, for example, schools, governmental entities, charitable entities, the military, or any other entity which may benefit from the modular software development techniques described herein.

In an aspect of the disclosure, the business object based application environment may be associated with a number of developmental entities and associated development tools that are designed to allow developers to generate functionalities and results using existing business objects. For instance, developmental tools may include tools for generating a user interface including a graphical user interface (GUI) based on one or more business objects, and/or may include report generation tools that enable business objects to generate reports and other analyses of data included in, or associated with, one or more business objects. Such developmental tools including other features and functions of a business object based application environment illustrate, for example, the nature and extent of interoperability between business objects, as well as the ease and flexibility of use of the business objects in obtaining a desired result.

In another aspect of the disclosure, one or more external applications may be configured to execute on remote servers that are in communication with the business object based application environment via an appropriate computer network (e.g., the Internet). Such applications may be configured to provide features and functionalities that may be considered useful or advantageous to a developer utilizing a business object based application environment. The application may expose some or all of its features and functionalities using a web service, which may utilize a number of known formats, techniques, and associated protocols for exposing the features and functionalities of the application in a discoverable manner. The web service may be exposed in a manner which provides for ease of interaction between the web service and other web services, or other application interfaces which are designed to be interoperable with the web service.

In reference to the example of FIG. 1, the security management system 100 may be implemented as a server including the computing device 104 and instructions recorded on the non-transitory computer-readable medium 112 and executable by the at least one processor 110. The security management system 100 may include the display device 150 for providing output to a user, and the display device 150 may include the UI 152 (e.g., GUI) for receiving input selections from the user.

In an aspect of the disclosure, to achieve secure business applications, the security management system 100 is configured to ensure indisputably with integrated system support that each provided business application is compliant to a holistic security contract that considers relevant security instances and covers relevant parts of the business application. In an implementation, the built-in security enforcement framework is part of the development infrastructure that enables and enforces a holistic security handling for each developed business application from start of development.

In various implementations, holistic security handling may include various features. For example, security relevance may be defined to ensure that each component and module of a business application may be classified in reference to their security relevance. In another example, security rules may be defined to assign security rules for each module or component classified as security relevant. In another example, validation and test fulfillment of security rules may be defined to provide one or more runtime modules for each defined security rule. In this instance, each provided runtime module may be configured to ensure fulfillment of assigned security rules.

As shown in the example of FIG. 1, the security management system 100 may include a security compliant manager 120 configured to cause the at least one processor 110 to manage development of business applications based on security relevance and security rules for one or more entities used by a security enforcement framework (e.g., the built-in security enforcement framework) for each business application. In an example, the security management system 100 may be implemented as a server comprising the built-in security enforcement framework, which is described in greater detail herein, for example, in reference to FIG. 4.

In an implementation, the one or more entities of each business application may comprise one or more development entities that may be used by the security enforcement framework of each business application. In another implementation, each entity of each business application may comprise at least one of a component and a module of each business application.

The security compliant manager 120 may include a security relevance handler 122 configured to provide one or more security relevance definitions 123 by defining the security relevance for data types associated with business objects and by ensuring that the one or more entities of each business application are classified in reference to the security relevance of the data types for the business objects. Each of the security relevance definitions 123 may be stored and maintained in a security relevance definition database 140.

In various implementations, the security relevance classification may be applied to various building blocks of each business application on various levels. For example, the security relevance classification may be applied to an elementary level building block of the business application on a data type level. In another example, the security relevance classification may be applied to a higher level building block of the business application on a user interface level. In other examples, the security relevance classification may be passed to other building blocks of the business application as an inheritance of the security relevance of the data types for the business objects.

In an implementation, each data type may comprise a semantic, and/or each data type may be classified by the security relevance for each data type. In various other implementations, the data types may comprise domain specific global data types that are security relevant including, for example, at least one of a password, a credit number, and/or an employee number, such as, for instance, an employee social number, a social security number, or some other personal identification number related to a user, client, or employee.

The security compliant manager 120 may include a security rules handler 124 configured to provide one or more security rule definitions 125 by defining the security rules for the data types associated with the business objects by assigning the security rules to each entity of each business application classified by the security relevance of the data types for the business objects. Each of the security rule definitions 125 may be stored and maintained in a security rule definitions database 142.

The security compliant manager 120 may include a validation handler 126 configured to define validation and test fulfillment of the security rules by providing one or more security runtime modules 127 for each security rule defined by the security rules handler 124 to ensure validation and test fulfillment of each security rule assigned to each entity of each business application classified by the security relevance of the data types for the business objects. Each of the security runtime modules 127 may be stored and maintained in a security runtime module database 144.

The security compliant manager 120 may include a security compliant observer 128 that may be configured to assist with ensuring validation and test fulfillment of each security rule by tracking assignment and invocation of each security runtime module 127. In an implementation, the security compliant observer 128 may be configured to manage a set of security plug-ins integrated in all relevant common frameworks and ensures that security rules are fulfilled not only at design time but also at runtime by tracking the assignment and invocation of appropriate runtime modules.

In reference to the example of FIG. 1, a global data type (GDT) password may comprise a data type representing a password that may be used as part of credentials or may be used to access specific data. In accordance with aspects of the disclosure, the GDT password itself may be classified as security relevant. Further, in an example, the security rules may define a password that is not readable and/or not masked on a user interface. In another example, the security rules may define a password that may be encoded when persisted to a database. As such, in various examples, each data type may comprise a domain specific global data type that is security relevant, such as a password, a credit number, and/or an employee number.

In various implementations, to ensure compliance to these defined security rules, security runtime modules that may be invoked by the appropriate runtime plug-in may be assigned to fulfill the security rules and ensure that those rules are fulfilled. In the example of the password, the security runtime modules may be called on data type level and may be executed in a frontend runtime engine as well as in backend runtime engine depending on an access path.

In another implementation, the data type for a credit card number may be classified as security relevant. In an example, for this data type, a first security rule may define that only the last four (4) digits are visible on a user interface screen. In another example, a second security rule may define that a credit card number may be encoded during outgoing message communication.

In this instance, validation and fulfillment of these above-described rules may not be achieved on data type level or business object level but on user interface and process agent framework level. For the first security rule, user interfaces including this data type may be classified automatically as security relevant. For each relevant user interface entity, the assigned rule may be configured differently, wherein it may be taken over, overridden, or set to not applicable (e.g., in a case where some screens make all digits visible). For the second security rule, communication messages that include the above mentioned data type may be classified as security relevant. In either case, the above defined rules may be classified as not applicable for messages used for communication cross development units even if they include the above mentioned data type. For other messages, a security runtime module may be assigned to ensure that the data type for the credit card number is encoded in an outbound message.

Figure 2:
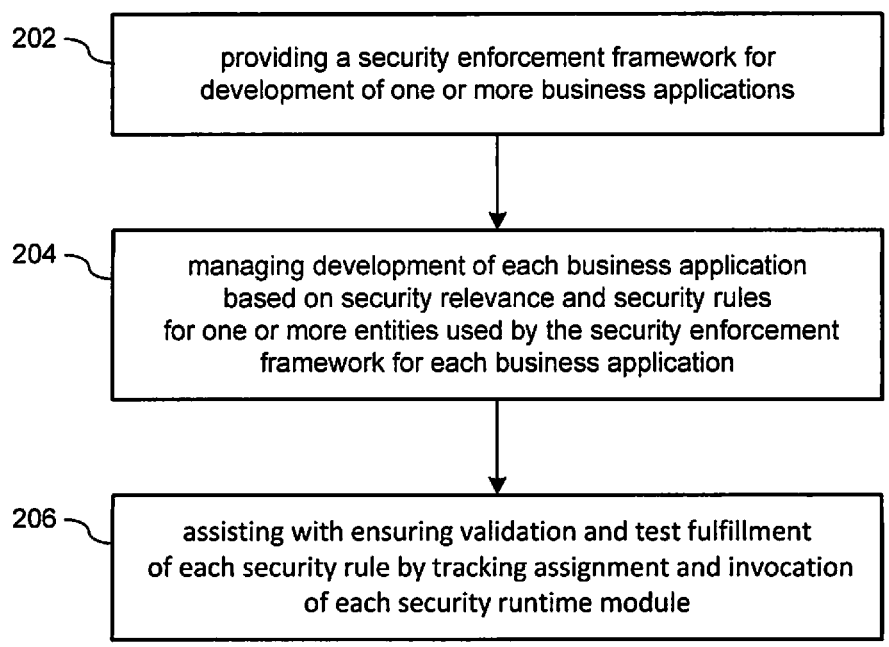
FIG. 2 is a process flow illustrating an example method for managing development of business applications, in accordance with aspects of the disclosure.

FIG. 2 is a process flow illustrating an example method 200 for managing development of business applications, in accordance with aspects of the disclosure.

In the example of FIG. 2, operations 202-206 are illustrated as discrete operations occurring in sequential order. However, it should be appreciated that, in other various implementations, two or more of the operations 202-206 may occur in a partially or completely overlapping or parallel manner, or in a nested or looped manner, or may occur in a different order than that shown. Further, in various instances, additional operations, that may not be specifically illustrated in the example of FIG. 2, may also be included in some implementations, while, in other implementations, one or more of the operations 202-206 may be omitted.

In the example of FIG. 2, the method 200 may include a process flow for a computer-implemented method configured for managing the development of business applications in the system 100 of FIG. 1. Further, as described herein, the operations 202-206 are configured to provide a simplified operational process flow that may be enacted by the computing device 104 to provide security features and functionalities as described in reference to FIG. 1.

In reference to the example of FIG. 2, at 202, the method 200 may include providing a security enforcement framework for development of one or more business applications. For instance, to achieve highly secure business applications, the security enforcement framework may be configured to ensure indisputably with integrated system support that each business application is compliant to a holistic security contract that consider one or all relevant security aspects and covers one or all relevant parts of each business application. As such, the built-in security enforcement framework may be a part of the development infrastructure that enables and enforces holistic security handling for each developed business application from start of development.

At 204, the method 200 may include managing development of business applications based on at least one of security relevance and security rules for one or more entities used by the security enforcement framework for each business application. For instance, holistic security handling that is used by the security enforcement framework may include defining security relevance by ensuring that one or all entities (e.g., one or more components and modules) of each business application are classified with respect to their security relevance. Further, in another instance, holistic security handling that is used by the security enforcement framework may include defining one or more security rules by assigning the one or more security rules for each entity (e.g., each of the one or more components and modules) that is classified as security relevant.

At 206, the method 200 may include assisting with ensuring validation and test fulfillment of each security rule by tracking assignment and invocation of each security runtime module. For instance, holistic security handling that is used by the security enforcement framework may include defining validation and test fulfillment of the one or more security rules, wherein for each defined security rule, a security runtime module may be provided. Further, in this instance, the provided security runtime module may be configured to ensure the fulfillment of assigned security rules. In some examples, assisting with ensuring validation and test fulfillment of each security rule may include tracking assignment and invocation of each security runtime module.

In various implementations, each entity of each business application may include at least one development entity used by the security enforcement framework of each business application. Further, each entity of each business application may include at least one of a component and a module of each business application.

In an implementation, the security relevance classification may be applied to an elementary level building block of each business application, such as, for example, on a data type level. In another implementation, the security relevance classification may be applied to a higher level building block of each business application, such as, for example, on a UI level. Further, in still another implementation, the security relevance classification may be passed to other building blocks of each business application as an inheritance of the security relevance of the data types for the business objects.

Figure 3:
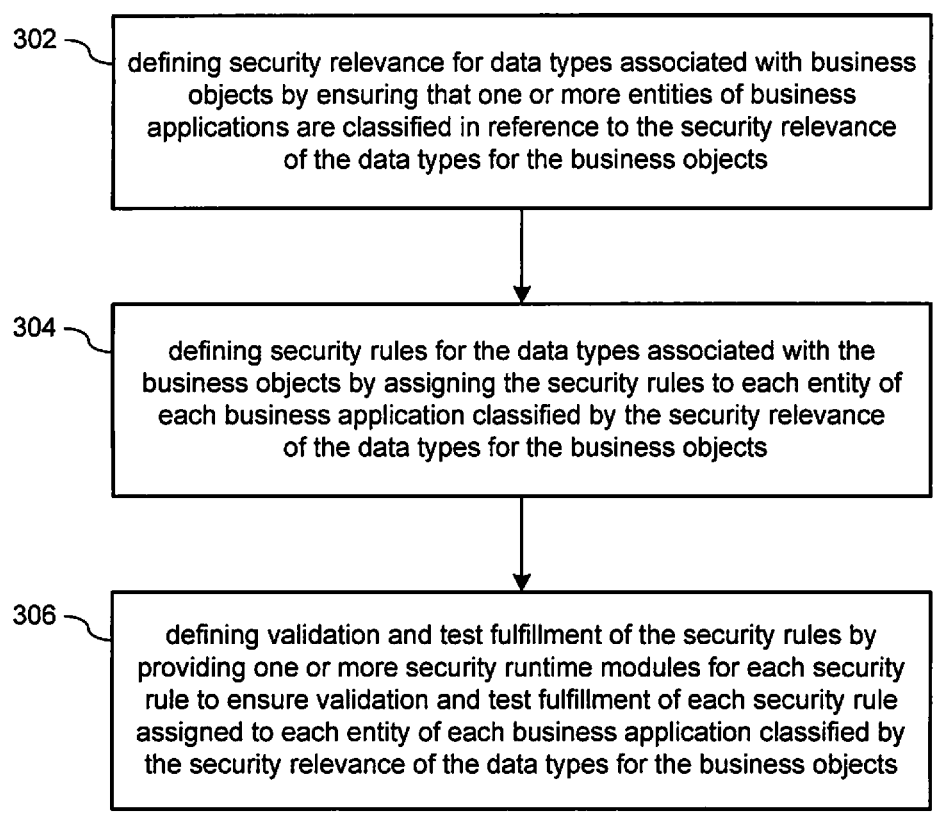
FIG. 3 is a process flow illustrating another example method for managing development of business applications, in accordance with aspects of the disclosure.

FIG. 3 is a process flow illustrating another example method 300 for managing development of business applications in reference to block 204 of method 200, in accordance with aspects of the disclosure.

In the example of FIG. 3, operations 302-306 are illustrated as discrete operations occurring in sequential order. However, it should be appreciated that, in other various implementations, two or more of the operations 302-306 may occur in a partially or completely overlapping or parallel manner, or in a nested or looped manner, or may occur in a different order than that shown. Further, in various instances, additional operations, that may not be specifically illustrated in the example of FIG. 3, may also be included in some implementations, while, in other implementations, one or more of the operations 302-306 may be omitted.

In the example of FIG. 3, the method 300 may include a process flow for a computer-implemented method configured for managing the development of business applications in the system 100 of FIG. 1. Further, as described herein, the operations 302-306 are configured to provide a simplified operational process flow that may be enacted by the computing device 104 to provide security features and functionalities as described in reference to FIG. 1.

In various implementations, one or more of the operations 302-306 of the method 300 of FIG. 3 may be included as part of the process flow for the example method 200 of FIG. 2. Thus, one or more of the operations 302-306 of example method 300 may be implemented with one or more of the operations 202-206 of example method 200 to provide a simplified operational process flow that may be enacted by the computing device 104 to provide features and functionalities as described in reference to FIG. 1.

In the example of FIG. 3, at 302, the method 300 may include defining the security relevance for data types associated with business objects by ensuring that the one or more entities of each business application are classified in reference to the security relevance of the data types for the business objects.

In reference to the example of FIG. 3, at 304, the method 300 may include defining the security rules for the data types associated with the business objects by assigning the security rules to each entity of each business application classified by the security relevance of the data types for the business objects.

In an implementation, the security relevance classification may begin at the first and elementary building block of a business application, for example, on a data type level. In some examples, each data type may include semantic and may be classified with respect to its security relevance. For instance, some global types may be classified as security relevant, such as password, credit number, and employee number.

In an implementation, security relevance classifications may be inherited to other business application building blocks or development entities including or using elementary entities. For instance, when a business object (BO) uses a data type that is classified as security relevant, the business object (BO) itself may become classified as security relevant. As such, entities using business objects (BOs), such as, for example, user interface or analytical report may become security relevant. For each entity that is classified as security relevant, a security rule and security runtime module should be assigned. The assignment may be done directly on entity level or on sub-entity that may cause the security relevance classification.

In another implementation, security relevance classification may begin at a higher building block of a business application, for example, on a higher level, such as a user interface level. For instance, a user interface may be classified directly as security relevant even if the related business object or used global data types are not classified as security relevant.

Further, in reference to the example of FIG. 3, at 306, the method 300 may include defining validation and test fulfillment of the security rules by providing one or more security runtime modules for each security rule to ensure validation and test fulfillment of each security rule assigned to each entity of each business application classified by the security relevance of the data types for the business objects. In some implementations, ensuring validation and test fulfillment of each security rule may include tracking assignment and invocation of each security runtime module.

Figure 4:
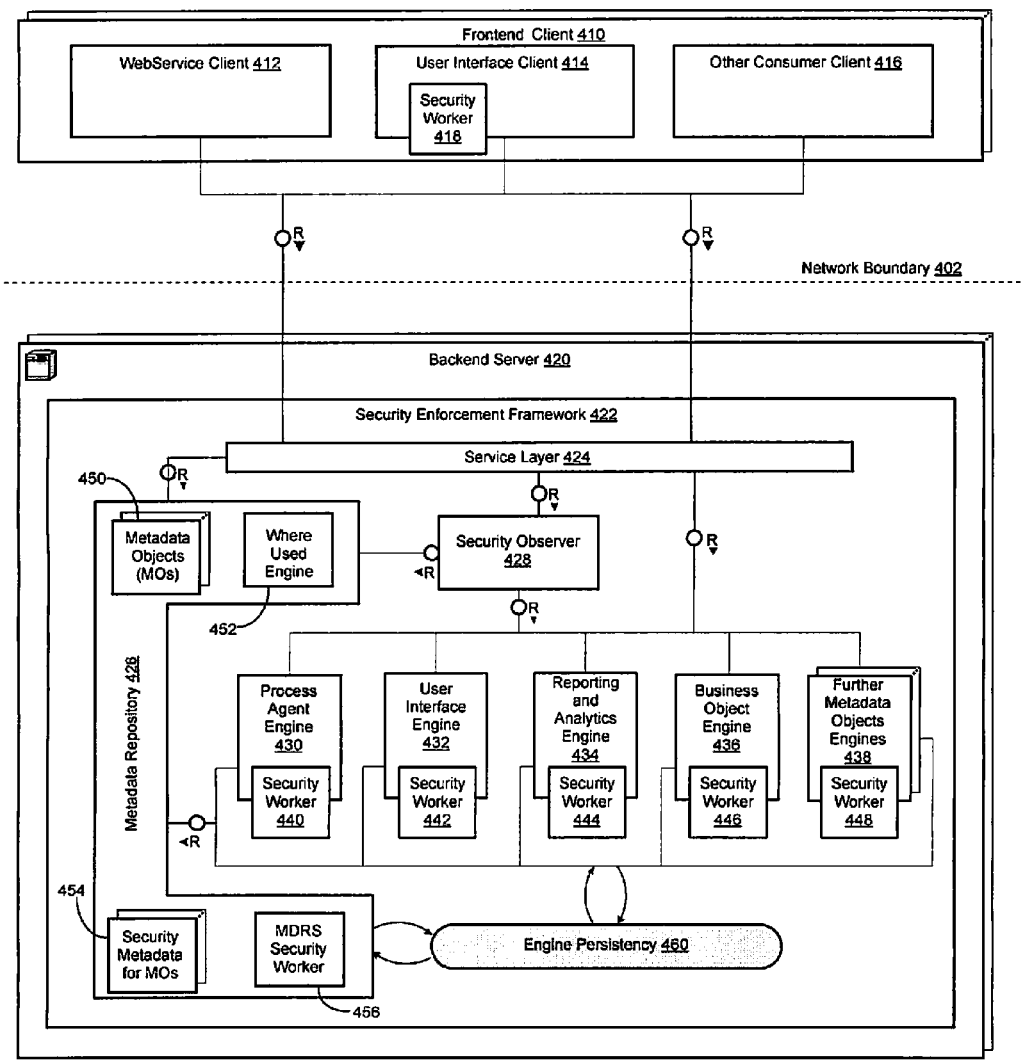
FIG. 4 shows an example security enforcement framework architecture, in accordance with aspects of the disclosure.

FIG. 4 shows an example architecture implementation 400 of a security enforcement framework 422, in accordance with aspects of the disclosure.

In the example of FIG. 4, the example architecture implementation 400 may include frontend client 410 and a backend client 420 with a network boundary 402 interposed therebetween. The frontend client 410 may include a web service client 412, a user interface client 414, and some other consumer client 416. The user interface client 414 may include a security worker 418. The backend client 420 may include the security enforcement framework 422 that may include a service layer 424, a metadata repository 426, and a security observer 428, and a engine persistency 460.

In various implementations, the frontend client 410 and the backend client 420 may refer to an initial stage and an end stage, respectively, of a security enforcement process related to the security enforcement framework 422. The frontend client 410 may be configured for obtaining or retrieving input (e.g., user input) in various forms from a user and processing the obtained or retrieved user input to comply with various security requirements and/or specifications that the backend client 420 may use. In an example, the frontend client 410 may the user interface client 414 as an interface between the user, the frontend client 410, and the backend client 422.

The security observer 428 may comprise a module that interfaces with one or more other security framework modules including administrator, security engineer, user interface, and console. The security observer 428 may be responsible for monitoring and configuration functions. The security observer 428 may be configured to manage a set of user interfaces and user screens that may create, maintain, and analyze the MDRS security metadata and a set of user interfaces and user screens for administrating and monitoring the runtime workers and their logs.

The security enforcement framework 422 may include one or more engines including, for example, a process agent engine 430, a user interface engine 432, a reporting and analytics engine 434, a business object engine 436, and one or more other metadata objects engines 438. Each runtime engine 430, 432, 434, 436, 438 may include a security runtime worker 440, 442, 444, 446, 448, respectively. The security runtime workers 440, 442, 444, 446, 448 may be invoked during processing of a primary artifact, such as a business object (BO) and/or a message type. When invoked, each security runtime worker 440, 442, 444, 446, 448 may be configured to check security relevance of the processed runtime artifact. Further, each security runtime worker 440, 442, 444, 446, 448 may be configured to interface with the MDRS security worker 456 to obtain or retrieve relevant security rules and security runtime modules to be executed to ensure the fulfillment of the security rules when needed. For auditing and tracing purposes, a worker specific log may be created and persisted, for example in the engine persistency module 460. The metadata evaluation and the interfacing with the MDRS worker 456 may be achieved on an instance level or a data type level depending on the involved metadata object, runtime engine, and/or defined security rule.

The metadata repository 426 may include one or more metadata objects (MOs) 450, a where used engine 452, security metadata for MOs 454, and a master data repository system (MDRS) security worker 456. In various example implementations, the metadata objects (MOs) 450 may be defined in the metadata repository 426, and representing development entities may be enhanced with additional metadata covering security aspects and supporting security enforcement. The metadata objects may include data type, a message type, a business object (BO), a multi-dimensional data provider, a user interface, and/or other relevant objects.

In an example, each business application may be decomposed in building blocks belonging to the above mentioned metadata objects. Relationships between all building blocks composing the application may be calculated using the where used engine 452 that is part of the metadata repository 426. The calculation of the where used relationships may be triggered via the MDRS security worker 456 that provides the interface between the security framework modules and the metadata repository 426. The security metadata may include one or more attributes including:

Security Classification:
  Value [Relevant/Not Relevant]
  Severity [Very high, High, Medium]
Classification Inheritance Allowed:
  Indicator [Yes, No]
Security Rule Definition:
  Security Rule Identifier
  Security Rule Name
  Short Description
  Long Text Description:
    Holistic explanation of security maybe used as base for hardcoded security runtime module and auditing
  Reference to Transformation Rule:
    Support dynamic and modeled security rule
  Activation Status:
    Value [Enabled/Disabled]
  Reason:
    Overridden by rule [Rule ID]
    Not Applicable
  List of Runtime Module Configuration:
    Invocation engine [ESF, PAF, MDAV,]
    Runtime module [Entity Identifier, e.g., global class name]
    Reference to security Rule [security Rules ID]

In reference to the example of FIG. 4, a security rule may be handled via several runtime engines, and therefore, it is possible to assign several runtime module configurations for the security rule. For example, password masking may be ensured by several runtime engines. Canonically, the frontend UI engine may be configured to achieve this. If the password is accessed by some other channel in the backend, the password may also be masked. In this case for this security rule, there may be more than one runtime module configured to fulfill this security rule.

In an implementation, the MDRS security worker 456 may be responsible for security metadata consistency and completeness. The MDRS security worker 456 may be configured to interface with MDRS metadata objects (MOs) and their security relevant attributes. Security relevance for entities including or referencing other entities may be calculated automatically by the MDRS security worker 456 based on the where used engine 452 and based also on the security metadata, such as security classification and inheritance indicator. For instance, the MDRS security worker 456 may be configured to decompose each business application in their build blocks and ensure that all parts are classified. The MDRS security worker 456 may start the default classification based on a set of data type classified as security relevant. Each entity may use or reference one of those data types that may be defaulted as security relevant, unless its inheritance indicator is set to false. For each entity defaulted as security relevant, the security rule definition and runtime configuration may be specified. During specification either already inherited rule may be overridden (e.g., deactivated and additional rules may be added) or an additional rule may be added as a complementary rule. In an example, a holistic static security metadata validation may be carried out by the MDRS security worker 456. In another example, a positive result may indicate that all applications are classified related to their security relevance and security rules are defined for them and runtime modules are assigned and configured.

In another implementation, the MDRS security worker 456 may be configured to interface with one or more of the security workers 440-448 in the security enforcement framework 422 that may be invoked in the runtime engines 430-438, respectively, and provide them with the calculated relevant security rules and the runtime modules that have to be processed. The MDRS security worker 456 may be configured to interface with the security observer module 428, provide the security observer module 428 with relevant information about security metadata persisted in the MDRS, and further provide results of executed validation checks for monitoring purposes.

In various implementations, to avoid performance drawbacks, standard caching and/or runtime load mechanisms may be implemented. Further, a deactivation of some runtime workers or deactivation of logging in productive usage may be provided depending on implemented and configured customer scenario.

In accordance with aspects of the disclosure, to provide highly secure business applications, the security requirements and features may be considered during software architecture and design process and may be fulfilled in first phases of software development. In an implementation, the built-in security enforcement framework 422 may be configured to compel the developers and security engineers to consider and handle the security aspects of a business application during modeling phase. Further, in another implementation, the built-in security enforcement framework 422 may be configured to support and enable definition, implementation, and compliance fulfillment of security rules covering all building blocks of a provided business application.

Moreover, in another implementation, the built-in security enforcement framework 422 may be enhanced to support fulfillment of standard security and compliance rules that may be defined by some certification authorities. The security and compliance rules may include business or technical characters and may cover different areas, such as auditing, data protection, minimal privileges, and/or separation of duties.

In accordance with aspects of the disclosure, implementations of various techniques, methods, and processes described herein may be implemented, for example, in digital electronic circuitry, or in computer hardware, firmware, software, or in some combination thereof. Implementations may implemented as a computer program product, i.e., a computer program tangibly embodied in an information carrier, such as, for example, in a non-transitory machine-readable storage device, in a non-transitory computer-readable medium, or in a propagated signal, for execution by, or to control the operation of, data processing apparatus, e.g., a programmable processor, a computer, or multiple computers. In some examples, a computer program, such as the computer program(s) described above, may be written in any form of programming language, including compiled or interpreted languages, and may be deployed in any form, including as a stand-alone program or as a module, component, subroutine, or other unit suitable for use in a computing environment. In other example, a computer program may be deployed to be executed on one computer or on multiple computers at one site or distributed across multiple sites and interconnected by a communication network.

In accordance with aspects of the disclosure, methods including method steps may be performed by one or more programmable processors executing a computer program to perform functions by operating on input data and generating output. In some examples, methods including method steps may be performed by, and an apparatus may be implemented as, special purpose logic circuitry, e.g., an FPGA (field programmable gate array) or an ASIC (application-specific integrated circuit).

In accordance with aspects of the disclosure, processors suitable for the execution of a computer program include, by way of example, both general and special purpose microprocessors, and any one or more processors of any kind of digital computer. Generally, a processor will receive instructions and data from a read-only memory or a random access memory or both. In some examples, elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. In other examples, the processor and memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In accordance with aspects of the disclosure, implementations may be implemented in a computer, a computer system, or computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. In some examples, components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium and executable by at least one processor, the system comprising:
    a security compliant manager configured to cause the at least one processor to manage development of business applications based on security relevance and security rules for one or more entities used by a security enforcement framework for each business application, wherein the security compliant manager includes:
        a security relevance handler configured to define the security relevance for data types associated with business objects by ensuring that the one or more entities of each business application are classified in reference to the security relevance of the data types for the business objects;
        a security rules handler configured to define the security rules for the data types associated with the business objects by assigning the security rules to each entity of each business application classified by the security relevance of the data types for the business objects;
        a validation handler configured to define validation and test fulfillment of the security rules by providing one or more security runtime modules for each security rule defined by the security rules handler to ensure validation and test fulfillment of each security rule assigned to each entity of each business application classified by the security relevance of the data types for the business objects, wherein the security relevance classification is applied at multiple different levels of the business application including on a data type level and a user interface level; and
        a security compliant observer configured to:
            assist with ensuring validation and test fulfillment of each security rule by tracking assignment and invocation of each security runtime module, and
            manage a set of security plug-ins integrated for multiple common frameworks to ensure each security rule is invoked by a plug-in from the set of security plug-ins and is fulfilled at both design time and runtime.

2. The system of claim 1, wherein each entity of each business application comprises at least one of a component and a module of each business application.

3. The system of claim 1, wherein each data type comprises a semantic, and wherein each data type is classified by the security relevance for each data type.

4. The system of claim 1, wherein the data types comprise domain specific global data types that are security relevant including at least one of a password, a credit number, and an employee number.

5. The system of claim 1, wherein the security relevance classification is passed to other building blocks of the business application as an inheritance of the security relevance of the data types for the business objects.

6. The system of claim 1, wherein the one or more entities of each business application comprise one or more development entities used by the security enforcement framework of each business application.

7. The system of claim 1, wherein the system comprises a server comprising the security enforcement framework.

8. A computer-implemented method, comprising:
    managing development of business applications based on security relevance and security rules for one or more entities used by a security enforcement framework for each business application, including:
        defining the security relevance for data types associated with business objects by ensuring that the one or more entities of each business application are classified in reference to the security relevance of the data types for the business objects;
        defining the security rules for the data types associated with the business objects by assigning the security rules to each entity of each business application classified by the security relevance of the data types for the business objects;
        defining validation and test fulfillment of the security rules by providing one or more security runtime modules for each security rule to ensure validation and test fulfillment of each security rule assigned to each entity of each business application classified by the security relevance of the data types for the business objects, wherein the security relevance classification is applied at multiple different levels of the business application including on a data type level and a user interface level;
        assisting with ensuring validation and test fulfillment of each security rule by tracking assignment and invocation of each security runtime module; and
        managing a set of security plug-ins integrated for multiple common frameworks to ensure each security rule is invoked by a plug-in from the set of security plug-ins and is fulfilled at both design time and runtime.

9. The method of claim 8, wherein each entity of each business application comprises at least one of a component and a module of each business application.

10. The method of claim 8, wherein:
    each data type comprises a semantic,
    each data type is classified by the security relevance for each data type, and
    each data type comprises a domain specific global data type that is security relevant including at least one of a password, a credit number, and an employee number.

11. The method of claim 8, wherein the one or more entities of each business application comprise one or more development entities used by the security enforcement framework of each business application.

12. A computer program product, the computer program product being tangibly embodied on a non-transitory computer-readable medium and comprising instructions that, when executed by at least one processor, are configured to:
    manage development of business applications based on security relevance and security rules for one or more entities used by a security enforcement framework for each business application, wherein the instructions, when executed by the at least one processor, are further configured to:

define the security relevance for data types associated with business objects by ensuring that the one or more entities of each business application are classified in reference to the security relevance of the data types for the business objects;

define the security rules for the data types associated with the business objects by assigning the security rules to each entity of each business application classified by the security relevance of the data types for the business objects;

define validation and test fulfillment of the security rules by providing one or more security runtime modules for each security rule to ensure validation and test fulfillment of each security rule assigned to each entity of each business application classified by the security relevance of the data types for the business objects, wherein the security relevance classification is applied at multiple different levels of the business application including on a data type level and a user interface level;

assist with ensuring validation and test fulfillment of each security rule by tracking assignment and invocation of each security runtime module; and manage a set of security plug-ins integrated for multiple common frameworks to ensure each security rule is invoked by a plug-in from the set of security plug-ins and is fulfilled at both design time and runtime.

13. The computer program product of claim 12, wherein each entity of each business application comprises at least one of a component and a module of each business application.

14. The computer program product of claim 12, wherein:
each data type comprises a semantic,
each data type is classified by the security relevance for each data type, and
each data type comprises a domain specific global data type that is security relevant including at least one of a password, a credit number, and an employee number.

15. The computer program product of claim 12, wherein the one or more entities of each business application comprise one or more development entities used by the security enforcement framework of each business application.

\* \* \* \* \*